United States Patent
Baumgartner et al.

(10) Patent No.: US 8,491,001 B2
(45) Date of Patent: Jul. 23, 2013

(54) AIRBAG DEVICE FOR A PEOPLE PROTECTION SYSTEM OF A VEHICLE AND A METHOD FOR PRODUCING IT

(75) Inventors: Peter Baumgartner, Günzburg (DE); Thomas Steck, Elchingen (DE)

(73) Assignee: Takata AG, Aschaffenburg (DE)

(*) Notice: Subject to any disclaimer, the term of this patent is extended or adjusted under 35 U.S.C. 154(b) by 0 days.

(21) Appl. No.: 13/589,903

(22) Filed: Aug. 20, 2012

(65) Prior Publication Data

US 2012/0313352 A1    Dec. 13, 2012

Related U.S. Application Data

(63) Continuation of application No. PCT/EP2011/052509, filed on Feb. 21, 2011.

(30) Foreign Application Priority Data

Feb. 23, 2010   (DE) .......................... 10 2010 002 261

(51) Int. Cl.
*B60R 21/16*   (2006.01)

(52) U.S. Cl.
USPC .................. 280/728.2; 280/728.1; 280/743.1

(58) Field of Classification Search
USPC .................. 280/743.1, 728.2, 728.1
See application file for complete search history.

(56) References Cited

U.S. PATENT DOCUMENTS

| | | | |
|---|---|---|---|
| 6,517,110 B1 | 2/2003 | Butters et al. | |
| 7,547,038 B2 | 6/2009 | Coleman | |
| 2003/0090092 A1 | 5/2003 | Salzle | |
| 2003/0094797 A1 | 5/2003 | Sonnenberg | |
| 2005/0206141 A1 | 9/2005 | Ishikawa et al. | |
| 2007/0145724 A1 | 6/2007 | Miwa et al. | |
| 2009/0102164 A1 | 4/2009 | Eckert et al. | |
| 2012/0074676 A1 | 3/2012 | Feller | |

FOREIGN PATENT DOCUMENTS

| | | |
|---|---|---|
| DE | 197 00 759 C1 | 1/1998 |
| DE | 197 52 989 A1 | 6/1998 |
| DE | 10 2009 024 142 A1 | 10/2009 |
| EP | 1 514 745 A1 | 3/2005 |
| EP | 1 976 728 B1 | 4/2007 |
| WO | WO 2009/049695 A1 | 4/2009 |

OTHER PUBLICATIONS

International Search Report PCT/EP2011/052509 Dated July 5, 2011.

*Primary Examiner* — Eric Culbreth

(74) *Attorney, Agent, or Firm* — Foley & Lardner LLP

(57) ABSTRACT

An air bag device for a people protection system of a vehicle, having a folded air bag which forms an air bag package having a length and a height. An inlay element, directly connected to and/or placed into the air bag, is provided having a length which essentially corresponds to the length of at least a section of the air bag package and having a height which essentially corresponds to the height of the air bag package. The inlay element is provided and arranged to define the folded air bag regarding its cross-section dimensions and to thereby fix it with desired cross-section dimensions. The inlay element is designed as an elongated flat section and is made of multiple segments, succeeding one another in the longitudinal direction of the air bag. At least one segment of the inlay element has a bore.

12 Claims, 5 Drawing Sheets

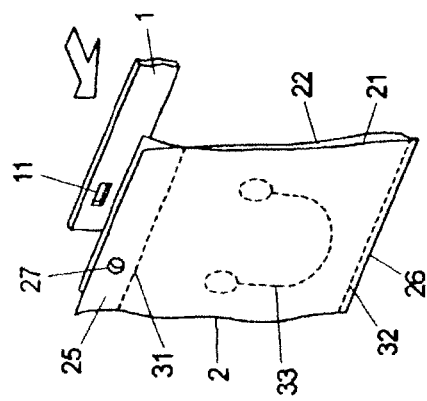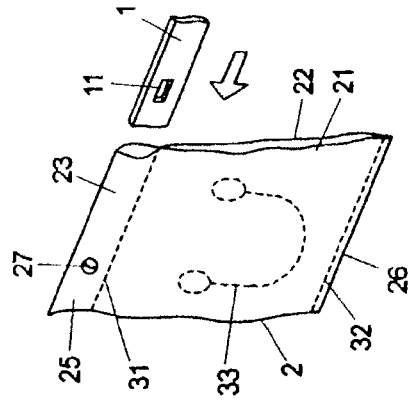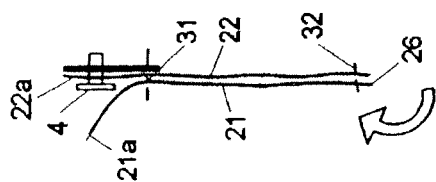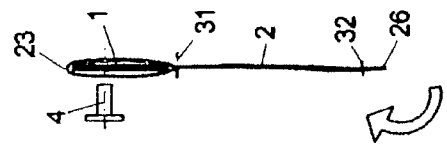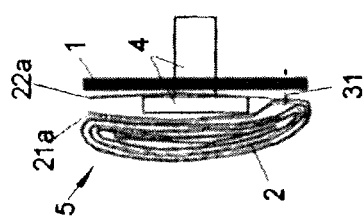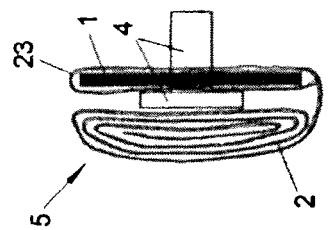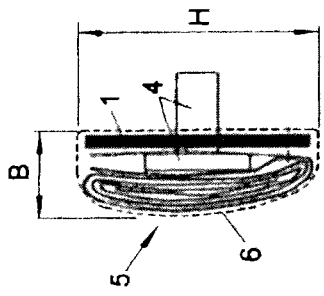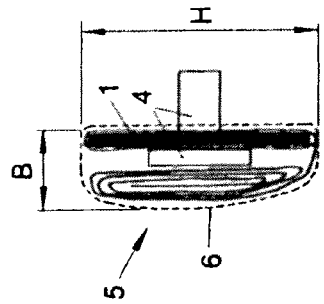

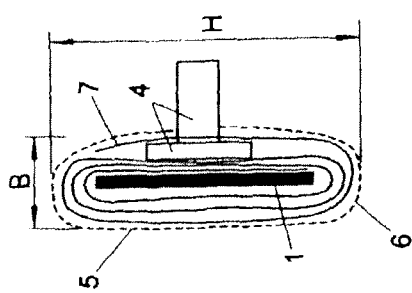
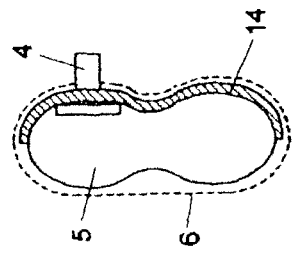
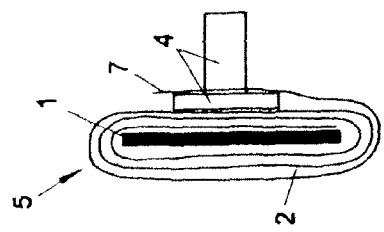
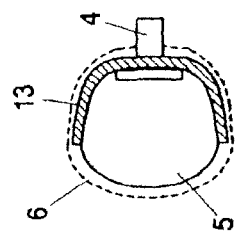
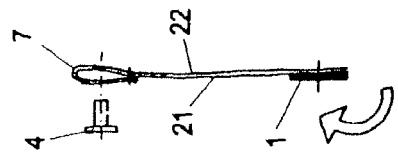
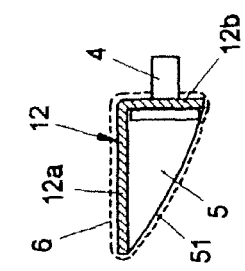
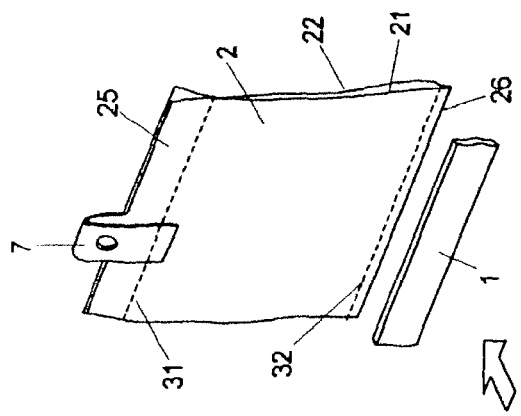

AIRBAG DEVICE FOR A PEOPLE PROTECTION SYSTEM OF A VEHICLE AND A METHOD FOR PRODUCING IT

CROSS-REFERENCE TO RELATED PATENT APPLICATIONS

This application is a continuation of International Patent Application Number PCT/EP2011/052509, filed on Feb. 21, 2011, which was published in German as WO 2011/104202. The foregoing international application is incorporated by reference herein.

BACKGROUND

The invention relates to an air bag device for a people protection system of a vehicle as well as to a method for producing such an air bag device.

Air bag devices are known which serve the protection of the head of a vehicle occupant in the event of a crash, particularly in the event of a side impact. Such air bag devices, also referred to as head air bags or head side air bags, have a folded air bag package which is produced for example by a zigzag folding or a rolled folding of an air bag. The folding concept influences the shape of the air bag package here. So, air bag packages with e.g. a zigzag folding have a square or a rectangular shape. With a rolled folding a round or a slightly oval air bag package is produced.

On account of the often confined space available in vehicles to accommodate an air bag device, there is the need to provide a high degree of flexibility regarding the adaptability of a folded air bag package to the available installation space.

To ensure the course of an air bag package along a vehicle it is known to insert plastic profiles into pre-defined pockets of a flexible envelope surrounding the folded air bag package. Such air bag devices for head air bags are for example employed in the Volkswagen Polo and the SEAT Ibiza. Inserting a positioning body into a pocket of a flexible envelope surrounding the folded air bag package is also known from WO 2009/049695 A1.

SUMMARY

An object underlying the invention is to provide an air bag device which, when the available space is confined, allows for an additional adaptability to the installation space needed to install the air bag device. Furthermore, a method for producing such an air bag device shall be provided.

According to an exemplary embodiment, the air bag device comprises an inlay element which is directly connected to and/or placed into the air bag. The inlay element has a length which essentially corresponds to the length of at least a section of the air bag package. The inlay element, furthermore, has a height which essentially corresponds to the height of the air bag package. Providing such an inlay element makes it possible to define the folded air bag regarding its cross-section dimensions and to thereby fix it with desired cross-section dimensions. In an embodiment it can here be provided that the folded air bag package is pushed against the inlay element, whereby the folded air bag package is reduced in its thickness.

The inlay element is hence provided and arranged to define the folded air bag regarding its cross-section dimensions and to thereby fix it with desired cross-section dimensions. The inlay element is designed as an elongated flat section.

The inlay element is furthermore made of multiple segments succeeding one another in the longitudinal direction of the air bag. At least one segment of the inlay element has a bore through which to pass a fastening means which serves to fasten the air bag device in a vehicle. This segment is foldably fastened onto the air bag package, so that it forms an air bag flap.

Providing an air bag device having such an inlay element thus allows to define the cross-section dimensions of the air bag package in a desired manner and to thereby reduce its thickness. Due to the additional flexibility in configuring an air bag device, connected to this, it can be achieved that even when the available space is confined an installation of an air bag device in a vehicle is possible.

The segmentation of the inlay part is connected to the effect that the air bag device can be more easily adapted to the course of the roof of a vehicle or to other areas of the vehicle, onto which the air bag device shall be mounted. That is to say, the inlay part causes on the one hand a size reduction of the air bag device or of the air bag package, respectively, and on the other hand an especially flexible possibility to adapt to different installation geometries.

The inlay part here also, particularly by forming an air bag flap of the foldable segment, serves as an anti-turning protection for fastening means, that is, as an element to protect against the turning of fastening elements.

The longitudinal extension of the air bag package in a first spatial direction is referred to as the length of the air bag package. When an air bag device for a protection of the head is installed in a motor vehicle this first spatial direction runs essentially parallel to the vehicle longitudinal axis (x-axis). An extension of the air bag package in a second spatial direction, which runs perpendicular to the first spatial direction, is referred to as the height of the air bag package. Additionally, the air bag package has a thickness, wherein an extension of the air bag package in a third spatial direction, which runs perpendicular to the first and the second spatial direction, is referred to as the thickness. An air bag package here does not only have a thickness when it is designed rectangular, but also when it has arc-shaped boundaries, for instance round or oval boundaries. In this case the thickness is defined by the greatest extension in the third spatial direction.

It is pointed out that the height and the thickness of the air bag package can vary, for example on account of the fact that the air bag is not designed rectangular and upon rolling it up or upon zigzag folding different amounts of air bag material accumulate in different areas. For this case, the maximum height and the maximum thickness, which the air bag package assumes, are referred to as height and thickness of the air bag package.

It is further pointed out that the height of the inlay element does not exactly have to match the height of the folded air bag package. A match merely has to take place "essentially." This is the case as long as the inlay element can, despite a different height compared to the height of the air bag package, fulfill the function to define the cross-section dimensions of the air bag package and to thereby, where applicable, even reduce the cross-section dimensions, in that the air bag package is pushed against the inlay element and thereby reduced in its thickness. In an exemplary embodiment it is here provided that the height of the inlay element exceeds or falls below the height of the air bag package by up to 50%. In other exemplary embodiments the height of the inlay element exceeds or falls below the height of the air bag package by up to 20%.

In an exemplary embodiment the inlay element is sewn together with a layer of the air bag and/or is connected to a layer of the air bag via fastening means which serve to fasten the air bag device in a vehicle. A possibly present second air bag layer can here serve as a protective layer, which is arranged over the fastening means.

In a further exemplary embodiment it is provided that the inlay element extends in the longitudinal direction of the air bag on an upper edge of the air bag, which said edge is to be fastened in a vehicle, wherein the air bag is folded towards the inlay element. In case the air bag device is part of a head air bag module, the longitudinal direction of the air bag here corresponds to the longitudinal direction of the motor vehicle. The air bag is here folded towards the upper edge and the inlay element positioned there. The manner of folding can basically be of any kind here. In embodiments a zigzag folding, a rolled folding or a combination of these two kinds of folding takes place.

In alternative embodiments the inlay element is not positioned on an upper, but on a lower edge of the air bag device, referring to the state of the air bag device in which it is installed in a vehicle. The inlay element here extends in the longitudinal direction of the air bag along the lower edge. Together with the inlay element the air bag is folded towards the upper edge, along which the air bag can be connected to a vehicle structure.

In a further exemplary embodiment it is provided that a fixing of the inlay element in relation to the air bag takes place by means of fastening means which serve to fasten the air bag device in a vehicle. Such fastening means are for example fastening elements, which extend through a bore of at least one air bag layer and of the inlay element, respectively. In particular, such a fastening element can be designed as a catch locking element, which is suited and designed to enter into snap-on connection with a corresponding opening in a vehicle structure. This allows for attaching such a fastening element—referring to the state of the air bag device in which it is installed in a motor vehicle—onto the rear side of the air bag device turned away from the vehicle interior, so that a blind assembly is possible.

The inlay element can be made of any material. In exemplary embodiments it is designed as a plastic part or as a sheet metal part.

As already mentioned, the inlay element is made of multiple segments succeeding one another in the longitudinal direction of the air bag. Here it can, furthermore, be provided that different segments of the inlay element have a different profile, for example depending on the thickness of the air bag in the considered segment and/or depending on the available installation space in the area of the considered segment.

As likewise mentioned already, at least one segment of the inlay element has a bore through which to pass a fastening means. This segment is foldably fastened onto the air bag package. The segment, foldably fastened onto the air bag, forms an air bag flap which serves to fasten the air bag in a vehicle. Together with a fastening means, inserted through the bore, such a flap can here be folded back onto the folded air bag package and be fixed there for example by means of an adhesive tape. This allows for a blind assembly of the air bag device.

The inlay element is basically designed elongated, i.e. it extends over the total length or at least over a partial section of the length of the air bag package. It is designed as an elongated profile which can basically have any shape, adapted to the structures in the vehicle. Presently, the inlay element is designed as a flat section, i.e. it is formed by an essentially rectangular, longitudinally extending plate. In other embodiments the inlay element is formed by an angle section or a round section.

In an exemplary embodiment the air bag device additionally has enveloping means, which envelop and fix the air bag package and the inlay element. The enveloping means here envelop the air bag package and the inlay element in an embodiment in such a way that the air bag package is fixed in a shape pushed against the inlay element. The definition of the cross-section dimensions, made possible on account of using an inlay element, and/or the reduction of the thickness of the air bag package is thus maintained by the enveloping means. Such enveloping means are for example a flexible envelope or adhesive strips.

When using a flexible envelope as enveloping means, it is provided in an embodiment that the envelope forms at least one foldable area, which is designed and suited, in the folded-in state, to come to rest over a fastening element, which serves to fasten the air bag device in a vehicle. The folded-in foldable area is here positioned between the fastening element and the folded air bag and protects the air bag material from a possible damage caused by the fastening element.

A method for producing an air bag device is disclosed herein. The method has the following steps: providing an air bag; providing an inlay element, which is designed as an elongated flat section, has a length and a height and is provided and arranged to define the folded air bag regarding its cross-section dimensions and to thereby fix it with desired cross-section dimensions, wherein the inlay element is made of multiple segments, succeeding one another in the longitudinal direction of the air bag, and wherein at least one segment of the inlay element has a bore through which to pass a fastening means, which serves to fasten the air bag device in a vehicle; fastening the inlay element onto the air bag and/or placing the inlay element into a pocket or a loop of the air bag; folding the air bag to form an air bag package having a length and a height, wherein the inlay element has a length which essentially corresponds to the length of at least a section of the air bag package, and the inlay element has a height which essentially corresponds to the height of the air bag package wherein the segment, which has the bore through which to pass a fastening means, is foldably fastened onto the air bag package, so that it forms an air bag flap.

In an exemplary embodiment it is provided that the air bag package is pressed against the inlay element after the folding process, wherein the air bag package is reduced in its thickness. A fixing of the air bag package, reduced in its thickness, further takes place during or after the pressing in such a way that the folding and the reduced thickness are maintained. For example, pressing the air bag package against the inlay element takes place while pulling the air bag package into a flexible envelope or while attaching adhesive tapes.

BRIEF DESCRIPTION OF THE DRAWINGS

The invention is subsequently further explained with reference to the figures of the drawing with the help of multiple exemplary embodiments.

FIGS. 1A-1D show the folding process as well as the folded air bag package of a first exemplary embodiment of an air bag device using an inlay element fastened onto the upper edge of an air bag.

FIGS. 2A-2D show the folding process as well as the folded air bag package of a second exemplary embodiment of an air bag device using an inlay element inserted into a pocket on the upper edge of an air bag.

FIGS. 3A-3D show the folding process as well as the folded air bag package of a third exemplary embodiment of an air bag device using an inlay element fastened onto a lower edge of the air bag.

FIG. 4 shows an air bag device having an air bag package and an inlay element designed as a flat section.

FIG. 5 shows an air bag device having an air bag package and an inlay element designed as an angle section.

FIG. 6 shows an air bag device having an air bag package and an inlay element designed as a round section.

FIG. 7 shows an air bag device having an air bag package and an inlay element, which is formed by a profile having basically any shape.

DETAILED DESCRIPTION

Figure 8B:
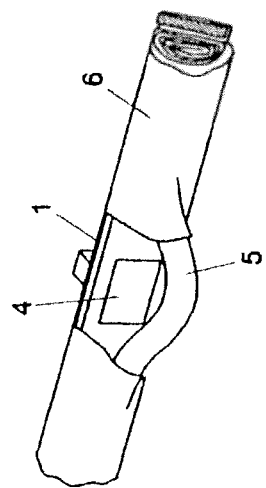
FIGS. 8A, 8B show an air bag device having a folded air bag package, an inlay element and a flexible envelope, wherein an access to the fastening element can be provided.

The invention is subsequently specified on the basis of air bag devices, which are designed in the form of a head protection device which, in the mounted state, extends along a lateral vehicle structure and in which the air bag in the inflated state forms one or multiple inflated areas, with which in particular at least one lateral window pane of a motor vehicle becomes largely coverable. The specification of the invention on the basis of such air bag devices for a protection for the head of a vehicle occupant in the event of a side impact, however, is to be understood merely as an example. The principles of the present invention can equally be realized in other kinds of air bag devices, for example in air bag devices which are designed as side air bags or in air bag devices which are arranged on the body shell of a motor vehicle and serve for the protection of other participants in traffic such as e.g. pedestrians.

FIGS. 1A to 1D show a first exemplary embodiment of an air bag device, comprising a folded air bag package as well as an inlay element, as well as a sequence of steps of the process for producing such an air bag device.

According to FIG. 1A an air bag 2 is provided, which is made of two air bag layers 21, 22. The air bag layers 21, 22 are connected to each other via two seams 31, 32, which are formed in the area of an upper edge 25 of the air bag 2 and in the area of a lower edge 26 of the air bag 2 and extend in the longitudinal direction of the flatly spread-out air bag. Additionally, darts 33 to define different areas of the air bag 2 can optionally be provided. In the event of deployment gas is channeled into the air bag 2 via a gas generator, not illustrated, whereby an extensive gas cushion is formed for the protection of a vehicle occupant in the event of a crash.

Above the upper seam 31 the two air bag layers 21, 22 form two fabric strips 21a, 22a. An inlay element 1 is provided which is designed as a flat section and which likewise extends in the longitudinal direction of the air bag 2. The height of the material strips 21a, 22a here essentially corresponds to the height of the inlay element 1.

The inlay element 1 is connected to the one material strip 22a. This takes place for example via a fastening element 4, which is inserted on the one hand through an opening 27 in the fabric layer 22a and on the other hand through an opening 11 in the inlay element 1. The fastening element 4 can here have catch locking elements, which are connectable by means of a snap-on connection to corresponding catch locking elements in a vehicle to fasten the air bag device in the vehicle.

According to FIG. 1B a connection of the inlay element 1 to the one air bag layer 22a takes place by means of the fastening element 4. Multiple such fastening elements 4 can be provided in the longitudinal direction of the air bag 2. It is pointed out here that FIG. 1A only illustrates a section of the air bag 2 and of the inlay element 1.

Instead of or supplementary to a connection of the inlay element 1 to the one air bag layer 22a other connecting means can also be provided to connect the inlay element 1 to the air bag layer 22a. For example, sewing up or adhesive bonding can take place.

The second air bag layer 21a serves as a protective layer over the fastening element 4. This protective layer 21a particularly protects the folded air bag 2 from a possible damage caused by the fastening element 4.

According to FIG. 1B the air bag is folded starting from its lower edge 26 in the direction of the upper edge 25. This folding takes place for example as a rolled folding, as illustrated in FIGS. 1C and 1D. Equally, however, a zigzag folding, a combination of a rolled folding and a zigzag folding or any other folding can also be employed.

Folding the air bag 2 to form an air bag package 5 takes place in such a way that the height H of the folded air bag essentially corresponds to the height of the inlay element 1. The inlay element 1 further has a length (perpendicular to the drawing plane), which corresponds to the length of the entire air bag package 5 or at least of a section or partial area of the air bag package 5.

FIG. 1C shows the folded air bag package 5 which is completely fainted on one of the two sides of the flatly formed inlay element 1. It is possible on account of the essentially matching dimensions of the air bag package and the inlay element 1 to push the air bag package 5 against the inlay element and to hereby re-define the cross-section dimensions of the air bag package 5. For example, it is possible to flatten a round or oval shape of the air bag package, originally existing on account of a rolled folding, and to thereby reduce the thickness B of the air bag package.

To fix the re-defined shape of the air bag package 5, reduced in thickness where applicable, an enveloping means in the form of a flexible envelope 6 is provided, which is pulled around the air bag package 5 and the inlay element 1. The air bag device is then finished, and is provided and arranged to be mounted in a motor vehicle.

As the fastening elements 4 project on the rear side of the air bag package, a blind assembly is possible. Separate fastening flaps, which protrude from the folded air bag package 5, are not necessary.

Due to the inlay element 1, a defined height H and a defined and thereby reduced thickness B of the air bag package can thus be provided. The thickness B here depends on the height H of the inlay element 1 as well as on the covering area of the air bag in the z-direction referring to the state of the air bag device in which it is installed in a motor vehicle.

FIGS. 2A to 2D show an alternative exemplary embodiment which differs from the exemplary embodiment of FIGS. 1A to 1D in terms of the manner of fastening the inlay element 1 onto the air bag 2. So, in this exemplary embodiment, a pocket 23 is formed on the upper edge 25, which is formed for example by sewing together the two material strips 21a, 22a of FIGS. 1A to 1D. The pocket 23 can, however, alternatively also be produced separately and then be connected to the air bag 2. The inlay element 1 is inserted into the pocket 23 and in this manner connected to the air bag. Fixing the inlay element 1 in relation to the air bag 2 takes place, yet again, by means of one or multiple fastening elements 4, which reach through holes 27 in both layers of the pocket 23 as well as through an opening 11 in the inlay element 1.

Folding the air bag takes place as specified with reference to FIGS. 1A to 1D. After the folding an air bag package 5 exists, yet again, which has defined dimensions, can be reduced in its thickness by pressing it against the inlay element 1 and is fixed in its shape, reduced in thickness, by means of an envelope 6. Pressing the air bag package 5 against the inlay element 1 here does not have to take place in a separate step of the process, but instead it can take place when slipping over the envelope 6.

FIGS. 3A to 3D show an exemplary embodiment in which the inlay element 1 is not fastened onto the upper edge 25 but onto the lower edge 26 of the air bag 2. Here, the inlay element 1 is connected to the lower end 26 of the air bag in any kind of manner. The folding process takes place in such a way that the air bag 2 is folded towards the upper edge 25 together with the inlay element 1. Yet again, a rolled folding is illustrated, wherein another folding such as a zigzag folding or a combined rolled and zigzag folding can equally take place.

In the exemplary embodiment of FIGS. 3A to 3D the air bag 2 has additional air bag flaps 7 which serve to fasten the air bag on the motor vehicle by means of bolts 4, which reach through the flaps 7.

The folded air bag package 5 has a height which essentially corresponds to the height of the inlay element 1. Furthermore, a specific thickness B is provided, which can be reduced by pushing or pressing the folded air bag against the inlay element 1. After folding and pulling in the air bag into a cover 6, the result, analogous to the embodiments of FIGS. 1A to 1D and FIGS. 2A to 2D, is an air bag package which has a desired height H and a desired thickness B. The dimension of the thickness B here, yet again, depends on the height H of the inlay element 1 and on the covering area of the air bag in the z-direction.

It is pointed out that in the embodiment of FIGS. 3A to 3D the folded air bag package 5 protrudes relative to the inlay element 1 on account of rolling up the inlay element 1 in the rolled folding. In this respect, the height H of the air bag package is slightly greater than the height of the inlay element 1. The height of the inlay element 1 and of the folded air bag package 5 are, however, "essentially" identical in the sense that despite the different height the inlay element 1 is suited and designed to provide defined cross-section dimensions of the air bag package and to maintain them by means of the enveloping 6.

In FIGS. 1A to 3D the inlay element 1 is illustrated as a flat section in one piece. Instead of a one-piece design, however, a forming of the inlay element 1 out of a plurality of individual segments can be provided, which said segments succeed one another in the longitudinal direction of the air bag. Further, the fact that the inlay element 1 is designed as a flat section merely illustrates an exemplary embodiment. Possible shapes of the profile are illustrated in FIGS. 4 to 7. Insofar as the inlay element 1 is made of a plurality of individual segments, it can, furthermore, be provided that individual segments have different profiles.

In FIG. 4 an air bag device is illustrated, having a folded air bag package 5, a flat section 1 and a flexible envelope 6, which said air bag device corresponds to the air bag device of FIGS. 1D, 2D and 3D. In such a flat section for example a rolled folding can be flattened or a zigzag folding can additionally be reduced in its thickness.

FIG. 5 shows an angle section 12 having two legs 12a, 12b, which run orthogonal relative to each other and which lie against two sides of a folded air bag package 5. Between these legs 12a, 12b the air bag package 5 has an arc-shaped course 51, wherein the radius of the arc 51 depends on what kind of angle section 12 it is.

FIG. 6 shows an inlay element, which is designed as a round section 13. FIG. 7 shows an example for a profile 14 having any kind of shape, which is configured depending on how the shape of the air bag package can best be adapted to the shell construction of a motor vehicle.

It is pointed out that also in the exemplary embodiments of the inlay element 1, 12, 13, 14 of the FIGS. 4 to 7 the height of the inlay element 1, 12, 13, 14 essentially corresponds to the height of the folded air bag package 5.

Figure 8A:
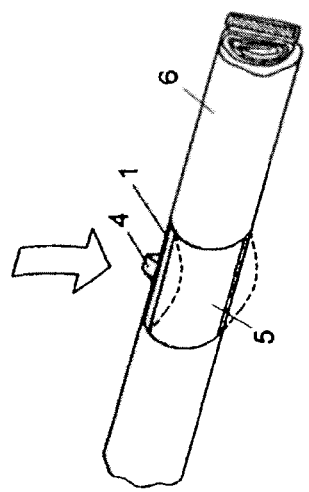

FIGS. 8A and 8B illustrate the accessibility of a fastening element 4 in case the air bag device has to be dismounted. For this purpose it is provided that a flexible envelope 6 is cut clear in the area of the fastening element 4 or is cut clear in case of need. The air bag package 5, positioned above the fastening element 4, is then pushed a little to the side, compare FIG. 8B. Afterwards, the fastening element 4 is accessible and the module can be dismounted according to a dismounting instructions manual.

It is pointed out that the inlay element 1 in FIGS. 8A, 8B can both be designed in one piece and also be formed out of individual segments.

FIGS. 9A, 9B, 10A, 10B, 11A, 11B show three variants for arranging a fastening element 4 on the rear side of an air bag device, which is for example designed corresponding to the air bag device of FIGS. 1A to 1D. The rear side here is that side of the air bag device which points in the direction of the lateral vehicle structure when the air bag device is mounted in a vehicle.

In all three variants the inlay element 1 is not designed in one piece, but instead it is interrupted on both sides in the area of one fastening element 4, respectively. A corresponding section 16 of the inlay element 1 is illustrated in FIG. 9A. The section 16 is connected to a correspondingly shaped material section 28 of the airbag via the fastening element 4 and is in this manner foldably fastened onto the air bag package 5. The section 16 and the material section 28 form an air bag flap 8 to fasten the air bag device onto a vehicle structure.

The air bag package 5 is surrounded by a continuous flexible envelope 6. The flap 8 formed by the material section 28 and the section 16 of the inlay element is led out of the envelope 6 through a cut-out in the envelope 6.

After pulling in the envelope 6 over the folded air bag package and the other sections of the inlay element, the air bag flap 8 is fixed on the rear side of the air bag device for example by means of two adhesive strips 91, 92. By folding the air bag flap back onto the envelope 6 and the air bag package 5, the total height of the arrangement is reduced to the height of the air bag package or of the inlay element 1, respectively. At the same time, the possibility for a blind assembly is provided by the fastening element 4, mounted on the rear side, which has catch locking elements to form a snap lock.

Figure 9B:
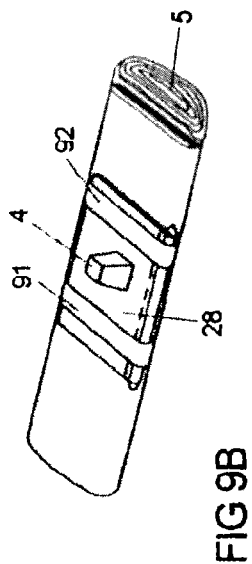
FIGS. 9A, 9B show a first design variant for attaching a fastening element onto an air bag device, which has a folded air bag package and an inlay element.
Figure 10B:
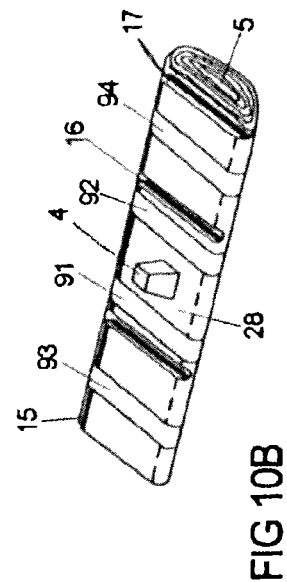
FIGS. 10A, 10B show a second design variant for attaching a fastening element onto an air bag device, which has a folded air bag package and an inlay element.
Figure 9A:
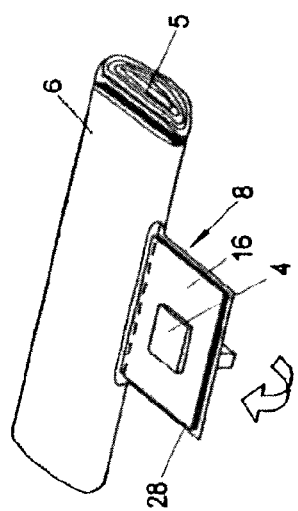
Figure 10A:
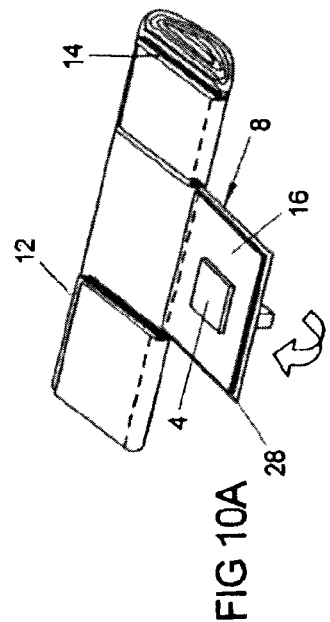

The design variant of FIGS. 10A, 10B corresponds to the design variant of FIGS. 9A, 9B except for the fact that the air bag device has no flexible envelope. Instead, the folded air bag package is fixed with adhesive strips 93, 94. In FIGS. 10A, 10B further segments 15, 17 of the inlay element can be seen.

Figure 11B:
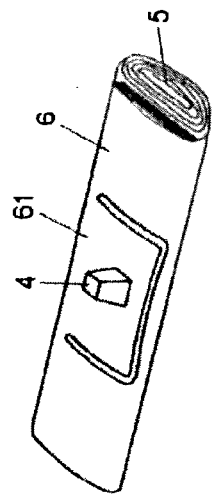
FIGS. 11A, 11B show a third design variant for attaching a fastening element onto an air bag device, which has a folded bag package and an inlay element.
Figure 11A:
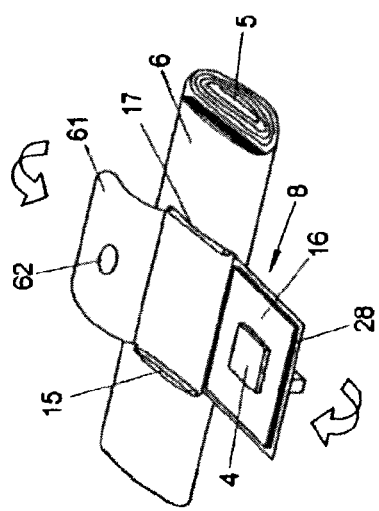

In the design variant of FIGS. 11A, 11B the flexible envelope 6 is cut out in the area of the air bag flaps 8 in such a way that after pulling in the air bag package and the inlay element into the envelope 6 this part can be folded away. The air bag flap 8 is designed corresponding to FIGS. 9A, 9B, 10A, 10B. The air bag flap 8 is laid or folded onto the bag package 5 and afterwards a foldable area 61 of the flexible envelope 6 is fixed over the fastening element 4. The fastening element 4 projects through a hole 62 in the foldable area 61. Additionally, a fixing can take place by means of adhesive strips.

In the design variants of FIGS. 9A, 9B, 10a, 10B, 11A, 11b it can basically also be provided that the inlay element 1 is designed in one piece, i.e. the inlay element 1 is not interrupted in the area of the fastening elements 4 or the air bag flaps 8. For this case, the section 16 would represent an additional inlay element which is folded onto the actual inlay element 1.

Alternatively, when providing an inlay element 1 in one piece it can be provided that separate air bag flaps corresponding to the air bag flaps 7 of FIG. 3A are provided. Such air bag flaps are e.g. led out of cut-outs of a flexible envelope, or the flexible envelope is made of segments, which are mounted to the left and to the right of such air bag flaps on the air bag package 5.

Figure 12C:
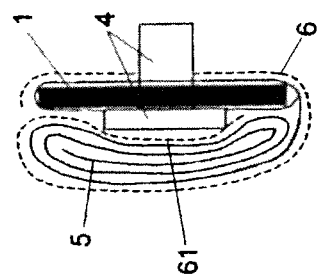
FIGS. 12A-12C show an exemplary embodiment of an air bag device having a folded air bag package, an inlay element and a flexible protective envelope, wherein the flexible protective envelope forms a foldable area which serves as a protective layer.
Figure 12A:
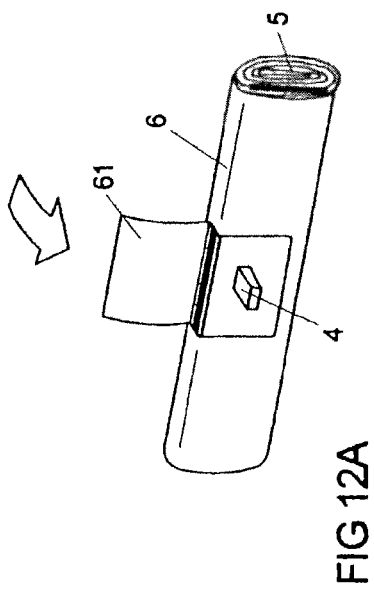
Figure 12B:
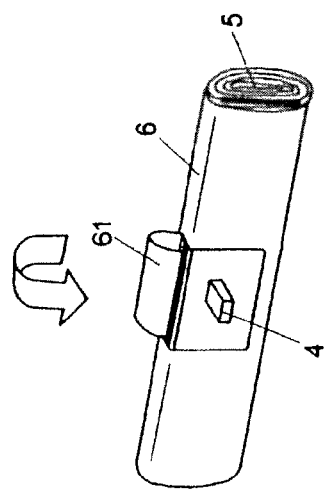

FIGS. 12A, 12B, 12C show an exemplary embodiment in which a flexible envelope 6, similar to how it does in FIGS. 11A, 11B, forms a foldable area 61. This area 61 is folded in, after pulling in the air bag package 5 and the inlay element 1 into the flexible envelope 6, in such a way that it comes to rest over the fastening element 4 and between the fastening element 4 and the air bag package 5. This serves for the protection of an air bag package 5. The inlay element 1 can here be formed in one piece or also out of multiple segments corresponding to FIGS. 9A, 9B, 10A, 10B, 11A, 11B.

The priority application, German Patent Application Number 10 2010 002 261.6, filed on Feb. 23, 2010 is incorporated by reference herein.

What is claimed is:

1. An air bag device for a people protection system of a vehicle, comprising
   a folded air bag which forms an air bag package having a length and a height, and
   an inlay element, directly connected to and/or placed into the air bag, having a length which essentially corresponds to the length of at least a section of the air bag package and having a height which essentially corresponds to the height of the air bag package,
   wherein the inlay element is provided and arranged to define the folded air bag regarding its cross-section dimensions and to thereby fix it with desired cross-section dimensions and is designed as an elongated flat section, and
   wherein the inlay element is made of multiple segments succeeding one another in the longitudinal direction of the air bag, in that at least one segment of the inlay element has a bore through which to pass a fastening means which serves to fasten the air bag device in a vehicle, and in that this segment is foldably fastened onto the air bag package so that it forms an air bag flap.

2. The air bag device according to claim 1, wherein the inlay element is sewn together with a layer of the air bag and/or is connected to a layer of the air bag via fastening means which serve to fasten the air bag device in a vehicle.

3. The air bag device according to claim 1, wherein the inlay element extends in the longitudinal direction of the air bag on an upper edge of the air bag, which said edge is to be fastened in a vehicle, wherein the air bag is folded towards the inlay element.

4. The air bag device according to claim 1, wherein the inlay element extends in the longitudinal direction of the air bag on a lower edge of the air bag, which said edge is to be folded up towards an upper edge, wherein the air bag is folded towards the upper edge together with the inlay element.

5. The air bag device according to claim 1, wherein a fixing of the inlay element in relation to the air bag takes place by means of fastening means which serve to fasten the air bag device in a vehicle.

6. The air bag device according to claim 5, wherein the fastening means comprise at least one fastening element which extends through a bore of at least one air bag layer and said bore of the inlay element, respectively.

7. The air bag device according to claim 1, wherein at least two segments of the inlay element have a different profile.

8. The air bag device according to claim 1, further comprising enveloping means which envelop the air bag package and the inlay element, wherein the enveloping means fix the air bag package in a shape pushed against the inlay element.

9. The air bag device according to claim 8, wherein the enveloping means are formed by a flexible envelope, wherein the envelope forms at least one foldable area which is designed and suited, in the folded-in state, to come to rest over a fastening element which serves to fasten the air bag device in a vehicle.

10. The air bag device according to claim 1, wherein the bore is a rectangular opening.

11. The method for producing an air bag device according to claim 1, with the steps:
    providing an air bag;
    providing an inlay element which is designed as an elongated flat section, has a length and a height and is provided and arranged to define the folded air bag regarding its cross-section dimensions and to thereby fix it with desired cross-section dimensions;
    wherein the inlay element is made of multiple segments succeeding one another in the longitudinal direction of the air bag and wherein at least one segment of the inlay element has a bore through which to pass a fastening means which serves to fasten the air bag device in a vehicle;
    fastening the inlay element onto the air bag and/or placing the inlay element into a pocket or a loop of the air bag;
    folding the air bag to form an air bag package having a length and a height, wherein the inlay element has a length which essentially corresponds to the length of at least a section of the air bag package, and the inlay element has a height which essentially corresponds to the height of the air bag package;
    wherein the segment, which has the bore through which to pass a fastening means, is foldably fastened onto the air bag package so that it forms an air bag flap.

12. The method according to claim 11, wherein the air bag package is pressed against the inlay element, wherein the air bag package is reduced in its thickness, and by fixing the air bag package, reduced in its thickness, during or after the pressing in such a way that the folding and the reduced thickness are maintained.

* * * * *